US012669842B2

(12) United States Patent
Duong et al.

(10) Patent No.: US 12,669,842 B2
(45) Date of Patent: Jun. 30, 2026

(54) REDUCING PHASE ERROR ASSOCIATED WITH PHYSICAL LAYER CLOCK SWITCHOVER

(71) Applicant: Juniper Networks, Inc., Sunnyvale, CA (US)

(72) Inventors: Anthony Lawrence Duong, Framingham, MA (US); Satish Gopalakrishnan, Fremont, CA (US); Srinivas Pattangi Seshadri, Fremont, CA (US); Suresh Namadev Mulekar, Fremont, CA (US); Kamatchi S. Gopalakrishnan, Dublin, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 103 days.

(21) Appl. No.: 18/913,445

(22) Filed: Oct. 11, 2024

(65) Prior Publication Data

US 2026/0104729 A1      Apr. 16, 2026

(51) Int. Cl.
*G06F 1/08*          (2006.01)
*G06F 1/14*          (2006.01)
(52) U.S. Cl.
CPC . *G06F 1/08* (2013.01); *G06F 1/14* (2013.01)
(58) Field of Classification Search
CPC .................................... G06F 1/08; G06F 1/14
See application file for complete search history.

(56) References Cited

U.S. PATENT DOCUMENTS

| | | | | |
|---|---|---|---|---|
| 7,218,901 B1 * | 5/2007 | Mobley | .............. | H04N 21/2362 |
| | | | | 455/182.2 |
| 2014/0286357 A1 * | 9/2014 | Shenoi | .................. | H04J 3/0688 |
| | | | | 370/503 |
| 2019/0020432 A1 * | 1/2019 | Chaudhari | ............ | H04J 3/0697 |
| 2023/0090431 A1 * | 3/2023 | Banin | ...................... | H04B 1/04 |
| | | | | 375/295 |

FOREIGN PATENT DOCUMENTS

| | | | | | |
|---|---|---|---|---|---|
| CN | 114966766 A | * | 8/2022 | ............. | G01S 19/30 |
| CN | 114966767 A | * | 8/2022 | ........... | G01S 19/256 |

\* cited by examiner

*Primary Examiner* — Christopher D Birkhimer
(74) *Attorney, Agent, or Firm* — Harrity & Harrity, LLP

(57)          ABSTRACT

A node determines a frequency offset between a physical layer clock and a local oscillator clock, wherein the node uses the physical layer clock as a clock source for a local time counter. The node tunes, based on the frequency offset, a frequency of the local oscillator clock. The node then identifies an issue that is associated with the physical layer clock and thereby causes the local oscillator clock to be the clock source for the local time counter. The node identifies, after causing the local oscillator clock to be the clock source for the local time counter, that the issue that is associated is resolved or that a time interval has elapsed, and thereby causes the physical layer clock, or another physical layer clock, to be the clock source for the local time counter.

20 Claims, 14 Drawing Sheets

500

510 — Determine a frequency offset between a physical layer clock and a local oscillator clock 520 — Tune a frequency of the local oscillator clock 530 — Identify an issue that is associated with the physical layer clock 540 — Cause the local oscillator clock to be the clock source for the local time counter

OR

550 — Identify that the issue that is associated with the physical layer clock is resolved 560 — Identify that a time interval since causing the local oscillator clock to be the clock source for the local time counter has elapsed 570 — Cause the physical layer clock, or another physical layer clock, to be the clock source for the local time counter

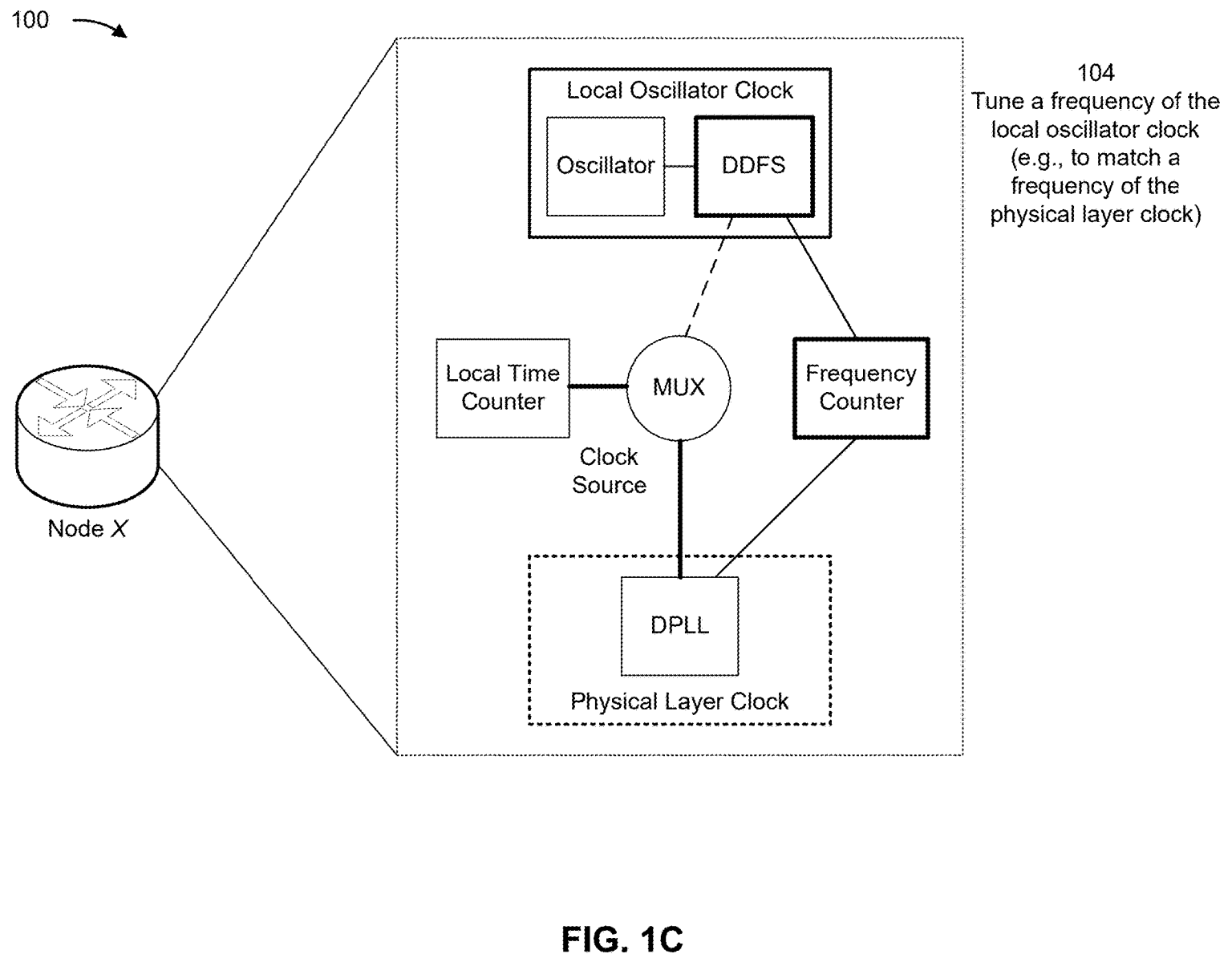

104
Tune a frequency of the local oscillator clock (e.g., to match a frequency of the physical layer clock)

100

Local Oscillator Clock

Oscillator

DDFS

Frequency Counter

MUX

Local Time Counter

Clock Source

DPLL

Physical Layer Clock

Node X

FIG. 1C

106
Identify an issue that is
associated with the
physical layer clock

108
Cause the physical layer clock to cease being the clock source for the local time counter 110
Cause the local oscillator clock to be the clock source for the local time counter

Figure 1F:
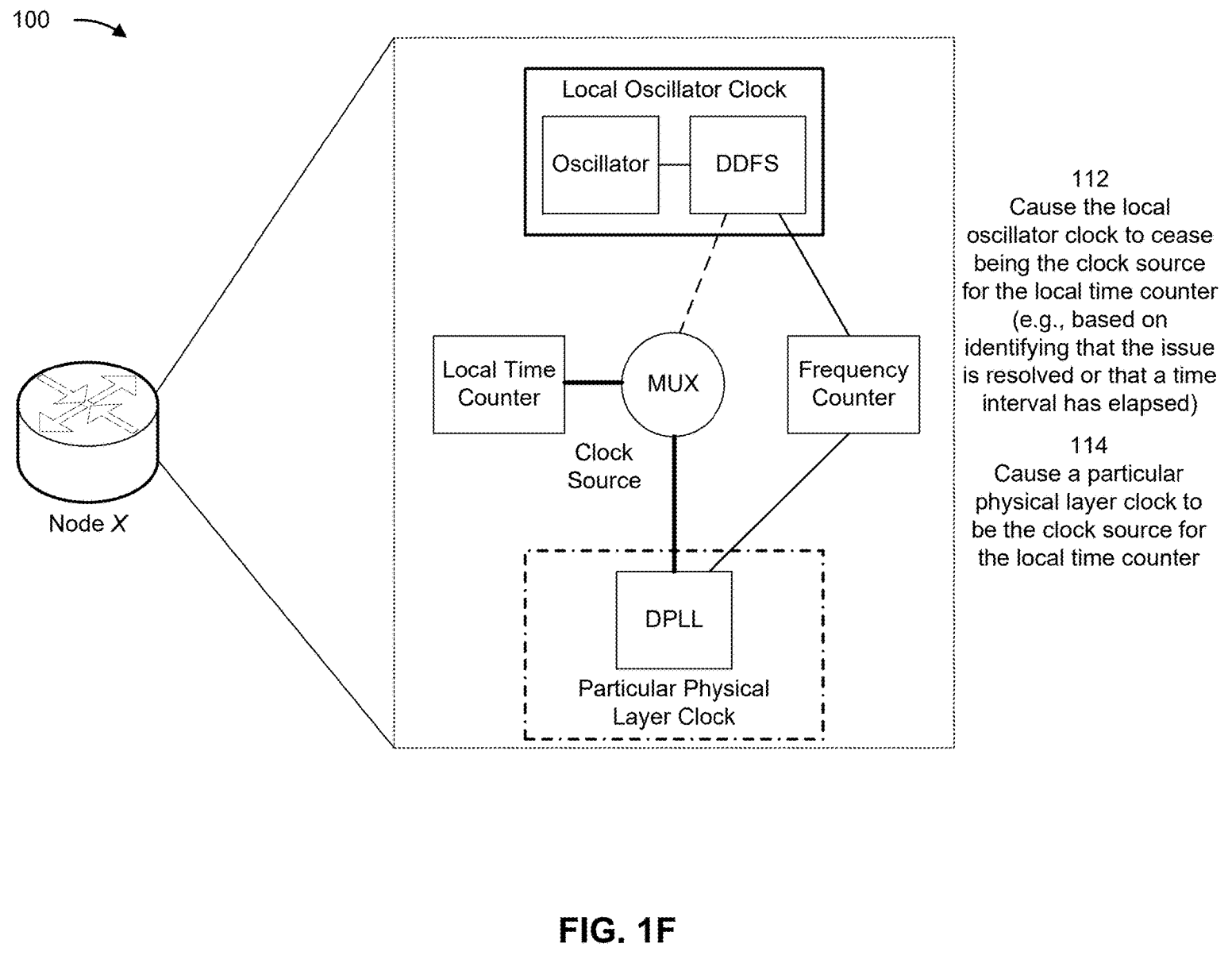

112
Cause the local oscillator clock to cease being the clock source for the local time counter (e.g., based on identifying that the issue is resolved or that a time interval has elapsed)

114
Cause a particular physical layer clock to be the clock source for the local time counter Local Oscillator Clock Oscillator

DDFS

Frequency Counter

MUX

Clock Source

Local Time Counter

DPLL

Particular Physical Layer Clock

Node X

Figure 1G:
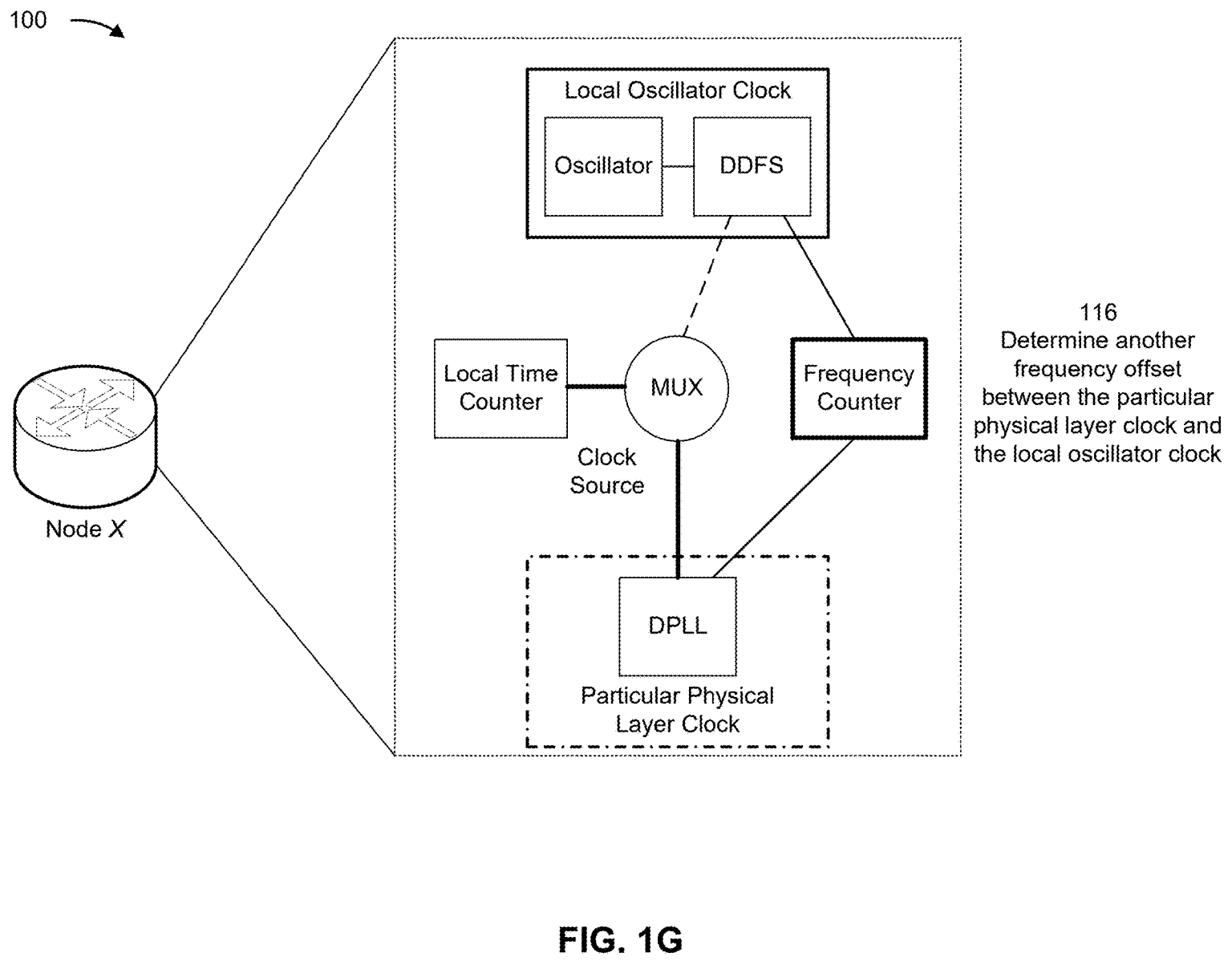

116
Determine another frequency offset between the particular physical layer clock and the local oscillator clock Local Oscillator Clock

DDFS

Oscillator

Frequency Counter

MUX

Clock Source

Local Time Counter

DPLL

Particular Physical Layer Clock

Node X

100

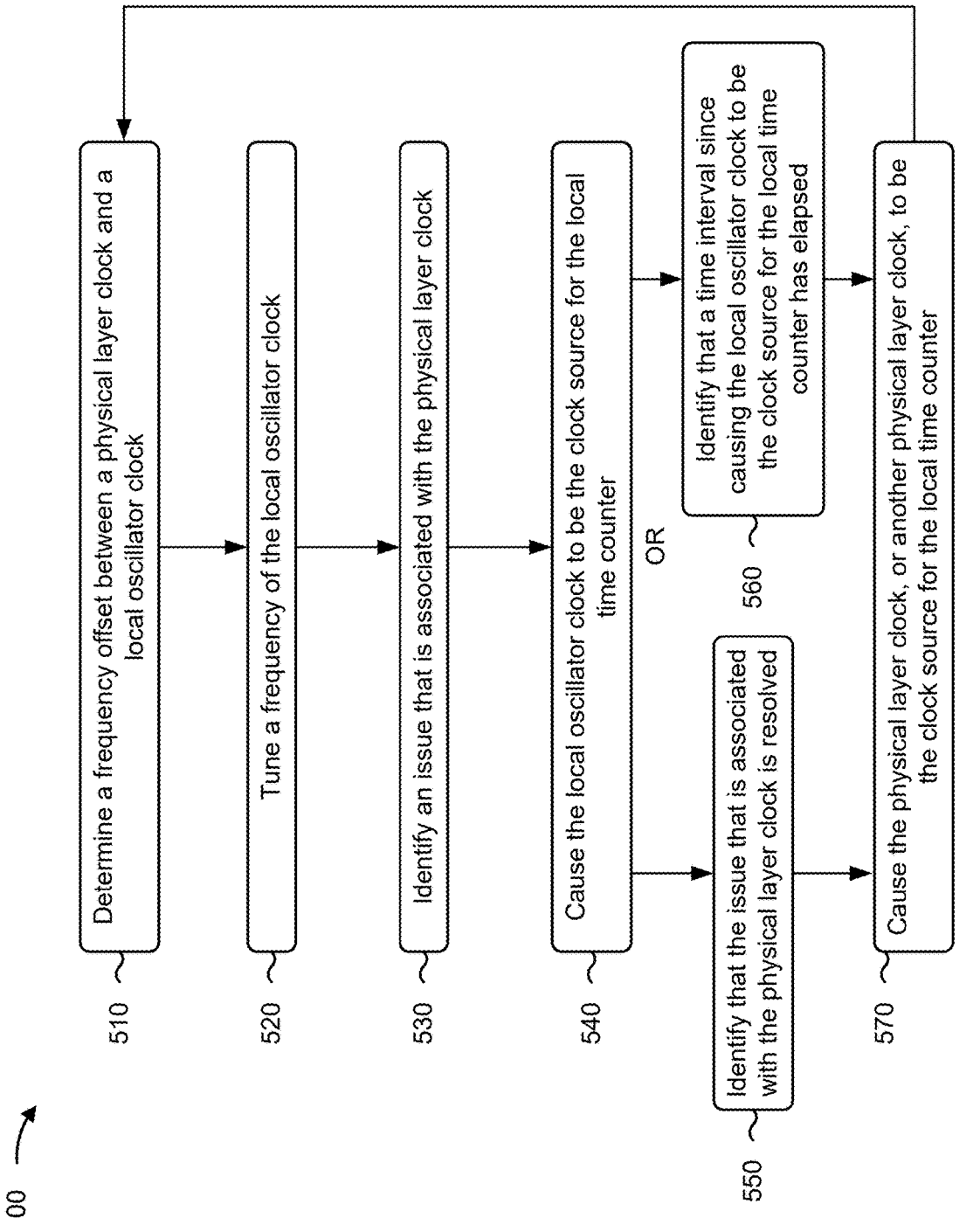

510 — Determine a frequency offset between a physical layer clock and a local oscillator clock 520 — Tune a frequency of the local oscillator clock 530 — Identify an issue that is associated with the physical layer clock 540 — Cause the local oscillator clock to be the clock source for the local time counter

OR

550 — Identify that the issue that is associated with the physical layer clock is resolved 560 — Identify that a time interval since causing the local oscillator clock to be the clock source for the local time counter has elapsed 570 — Cause the physical layer clock, or another physical layer clock, to be the clock source for the local time counter

REDUCING PHASE ERROR ASSOCIATED WITH PHYSICAL LAYER CLOCK SWITCHOVER

BACKGROUND

Synchronous Ethernet (Sync-E) provides physical layer synchronization to ensure that a frequency of a transmitted physical layer clock signal is synchronized across the network.

SUMMARY

In some implementations, a method includes determining, by a node, a frequency offset between a physical layer clock and a local oscillator clock, wherein the node uses the physical layer clock as a clock source for a local time counter; tuning, by the node and based on the frequency offset, a frequency of the local oscillator clock; identifying, by the node and after tuning the frequency of the local oscillator clock, an issue that is associated with the physical layer clock; and causing, by the node and based on identifying the issue that is associated with the physical layer clock, the local oscillator clock to be the clock source for the local time counter. The method may further include identifying, after causing the local oscillator clock to be the clock source for the local time counter, that the issue that is associated with the physical layer clock is resolved or that a time interval since causing the local oscillator clock to be the clock source for the local time counter has elapsed; and causing the physical layer clock, or another physical layer clock, to be the clock source for the local time counter.

In some implementations, a node includes one or more memories; and one or more processors to: determine a frequency offset between a physical layer clock and a local oscillator clock; tune, based on the frequency offset, a frequency of the local oscillator clock; identify, after tuning the frequency of the local oscillator clock, an issue that is associated with the physical layer clock; and cause, based on identifying the issue that is associated with the physical layer clock, the local oscillator clock to be a clock source for a local time counter. The one or more processors may further to: identify, after causing the local oscillator clock to be the clock source for the local time counter, that the issue that is associated with the physical layer clock is resolved or that a time interval since causing the local oscillator clock to be the clock source for the local time counter has elapsed; and cause the physical layer clock, or another physical layer clock, to be the clock source for the local time counter.

In some implementations, a non-transitory computer-readable medium storing a set of instructions includes one or more instructions that, when executed by one or more processors of a node, cause the node to: tune, based on a frequency offset between a physical layer clock and a local oscillator clock, a frequency of the local oscillator clock; identify, after tuning the frequency of the local oscillator clock, an issue that is associated with the physical layer clock; and cause, based on identifying the issue that is associated with the physical layer clock, the local oscillator clock to be a clock source for a local time counter. The one or more instructions, when executed by the one or more processors, may further cause the node to identify, after causing the local oscillator clock to be the clock source for the local time counter, that the issue that is associated with the physical layer clock is resolved or that a time interval since causing the local oscillator clock to be the clock source for the local time counter has elapsed; and cause the physical layer clock, or another physical layer clock, to be the clock source for the local time counter.

BRIEF DESCRIPTION OF THE DRAWINGS

FIGS. 1A-1J are diagrams of an example implementation associated with reducing phase error associated with physical layer clock switchover.

FIG. 5 is a flowchart of an example process associated with reducing phase error associated with physical layer clock switchover.

DETAILED DESCRIPTION

Figure 1A:
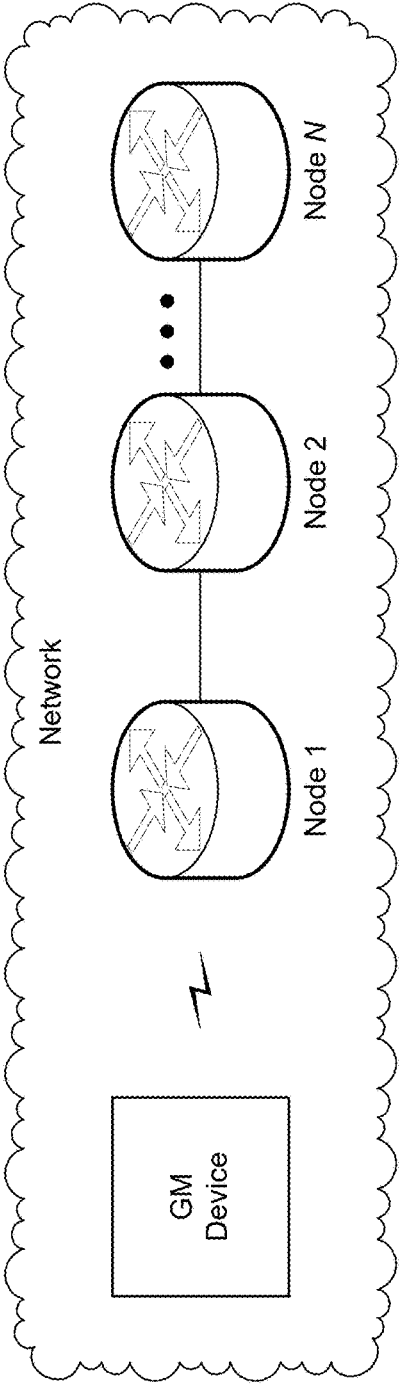

The following detailed description of example implementations refers to the accompanying drawings. The same reference numbers in different drawings may identify the same or similar elements.

Many (e.g., tens, hundreds, and/or thousands) of nodes (e.g., network devices and/or base stations) can be deployed in a synchronization network, such as a wireless network (e.g., a 4G or 5G network). When a node (e.g., associated with a base station) switches from a physical layer clock to another physical layer clock, as a clock source for a local time counter (e.g., as part of a physical layer clock switchover, such as due to an issue associated with the physical layer clock), the node often experiences an elevated phase error transient response (e.g., an elevated Sync-E phase error transient response). This error in frequency domain can impact a precision time protocol (PTP) domain local time counter, as defined by International Telecommunication Union (ITU) G.8273.2. For example, the phase error can exceed a phase error threshold (e.g., as defined by ITU G.8273.2) and may remain elevated for a substantial amount of time (e.g., greater than ten seconds). This detrimentally impacts a base station air interface operation.

Some implementations described herein include a node that includes a local oscillator clock and a local time counter. The node uses a physical layer clock as a clock source for the local time counter. In some implementations, the node determines a frequency offset between the physical layer clock and the local oscillator clock, and tunes, based on the frequency offset, a frequency of the local oscillator clock. For example, the node may tune the local oscillator clock to match (e.g., be equal to, within a tolerance) a frequency of the physical layer clock. Additionally, the node identifies, after tuning the frequency of the local oscillator clock, an issue that is associated with the physical layer clock (e.g., a link associated with the physical layer clock is down, a quality level (QL) of the physical layer clock is degraded, among other examples). The node therefore causes the physical layer clock to cease being the clock source for the local time counter and causes the local oscillator clock to be the clock source for the local time counter. That is, the node causes a physical layer clock switchover.

Notably, because the node tuned the frequency of the local oscillator clock to match the frequency of the physical layer clock (e.g., prior to the physical layer clock switchover), a phase error transient response (e.g., a Sync-E phase error transient response) of the node is reduced (e.g., as compared to switching to an untuned local oscillator clock). For example, because the local oscillator clock and the physical layer clock are frequency-matched (or nearly frequency-matched), any resulting phase error is due to an initial phase offset between the respective frequencies of the local oscillator clock and the physical layer clock, which, in many cases, is small and short-lived. This also results in less accumulation of additional phase error over time.

Accordingly, in many cases, a phase error transient response (e.g., a Sync-E phase error transient response) of the node is reduced (e.g., as compared to using an untuned local oscillator clock for a physical layer clock switchover). Thus, the phase error often does not exceed a phase error threshold (e.g., as defined by ITU G.8273.2), which improves a performance (e.g., a communication performance) of the node.

FIGS. 1A-1J are diagrams of an example implementation 100 associated with reducing phase error associated with physical layer clock switchover. As shown in FIGS. 1A-1J, example implementation 100 includes a master clock (e.g., a grandmaster (GM) clock) device (shown as a GM device), a plurality of nodes (shown as nodes 1 through N, where N≥2), and a network (e.g., a synchronization network). These devices and the network are described in more detail below in connection with FIG. 2 and FIG. 3.

As shown in FIG. 1A, the plurality of nodes may form a synchronization chain of nodes (e.g., from the GM device). Each node in the chain may communicate (e.g., via synchronization communications, such as according to Sync-E and PTP) with a parent node, or the GM device, to obtain timing information (e.g., a physical layer clock signal) to ensure that the node is synchronized (e.g. with the parent node and the GM device). Accordingly, the node and the parent node (or the GM device) may have what is sometimes termed a "master/slave" synchronization relationship. Each node may be a boundary clock (BC)-type node, an ordinary clock (OC)-type node, or another type of node.

As shown in FIGS. 1B-1J, a node (shown as node X, where 1≤X≤N) may include an oscillator and a direct digital frequency synthesizer (DDFS), which may (together) comprise a local oscillator clock of the node. For example, the oscillator and the DDFS may generate a local oscillator clock signal associated with the local oscillator clock. Further, the node may include a digital phase-locked loop (DPLL) (e.g., a Sync-E DPLL) that is associated with a physical layer clock (e.g., that is maintained by the GM device). The DPLL may provide a physical layer clock signal associated with the physical layer clock (e.g., that originated from the GM device and is received by the DPLL) to the node. The node may additionally include a local time counter (e.g., a time of day (TOD) counter), a multiplexer (MUX), and/or a frequency counter.

Figure 1B:
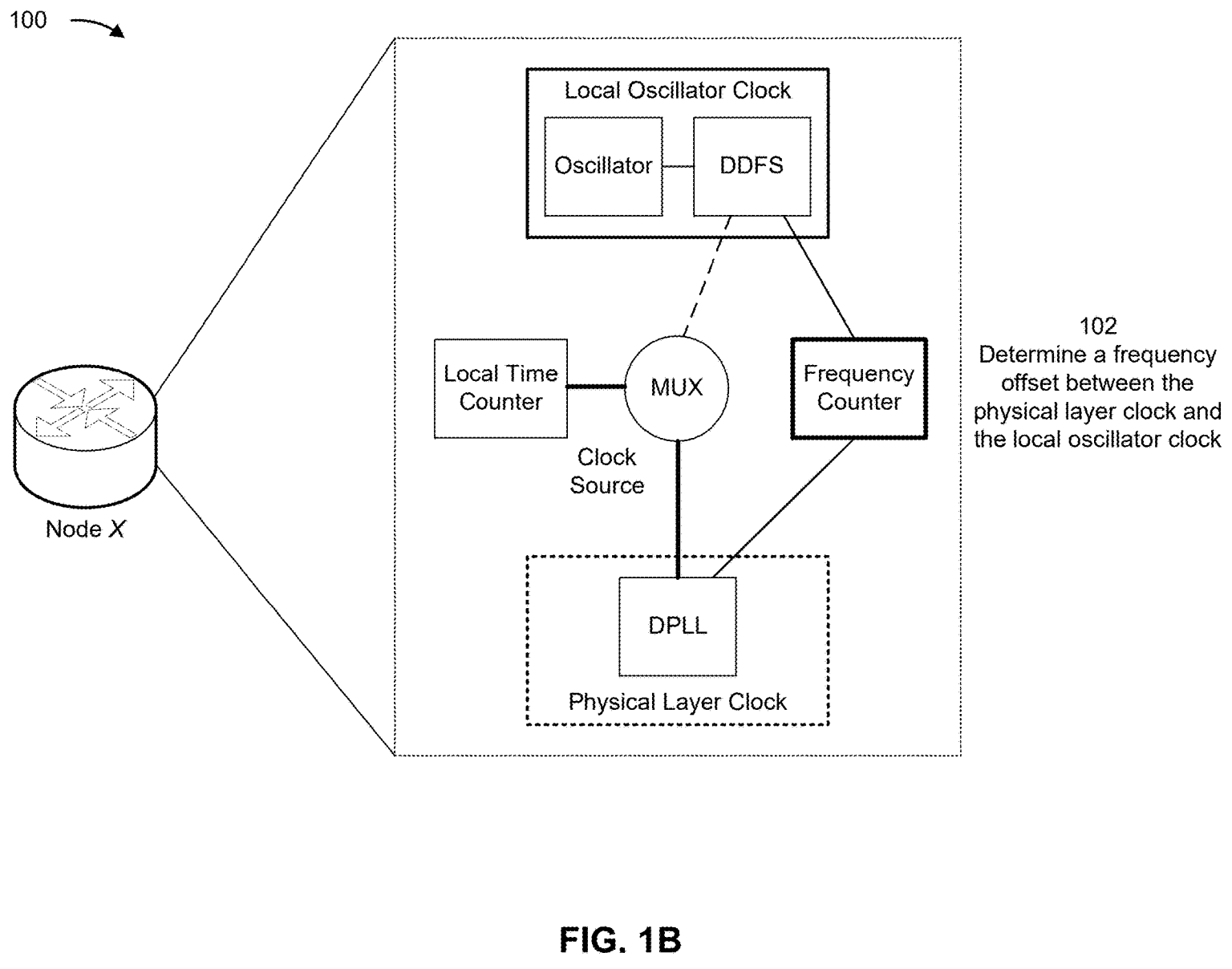

As shown in FIG. 1B, the node may use the physical layer clock as a clock source for the local time counter. For example, the node may use the physical layer clock signal associated with the physical layer clock (e.g., that is provided to node via the DPLL) to drive the local time counter. As further shown in FIG. 1B, the MUX may be enabled to forward the physical layer clock signal to the local time counter (and to prevent forwarding of the local oscillator clock signal from the local oscillator clock to the local time counter).

As shown by reference number 102, the node may determine a frequency offset between the physical layer clock and the local oscillator clock. In some implementations, the node may use the frequency counter to identify a first frequency associated with the physical layer clock, and may identify, using the frequency counter, a second frequency associated with the local oscillator clock. For example, the node (e.g., using the frequency counter) may sample the physical layer clock signal to identify the first frequency associated with the physical layer clock and/or may sample the local oscillator clock signal to identify the second frequency associated with the local oscillator clock. Accordingly, the node may determine the frequency offset based on the first frequency and the second frequency (e.g., by determining a difference between the first frequency and the second frequency).

As shown in FIG. 1C, and by reference number 104, the node may tune a frequency of the local oscillator clock (e.g., based on the frequency offset). For example, the node may send one or more frequency adjustment commands to the DDFS associated with the local oscillator clock. This may cause the DDFS to modify a frequency of the local oscillator clock signal (e.g., to allow the frequency of the local oscillator clock signal to be equal to, within a tolerance, of a frequency of the physical layer clock signal). In this way, in some implementations, the node may tune the frequency of the local oscillator clock to cause the frequency of the local oscillator clock to match a frequency of the physical layer clock.

Figure 1D:
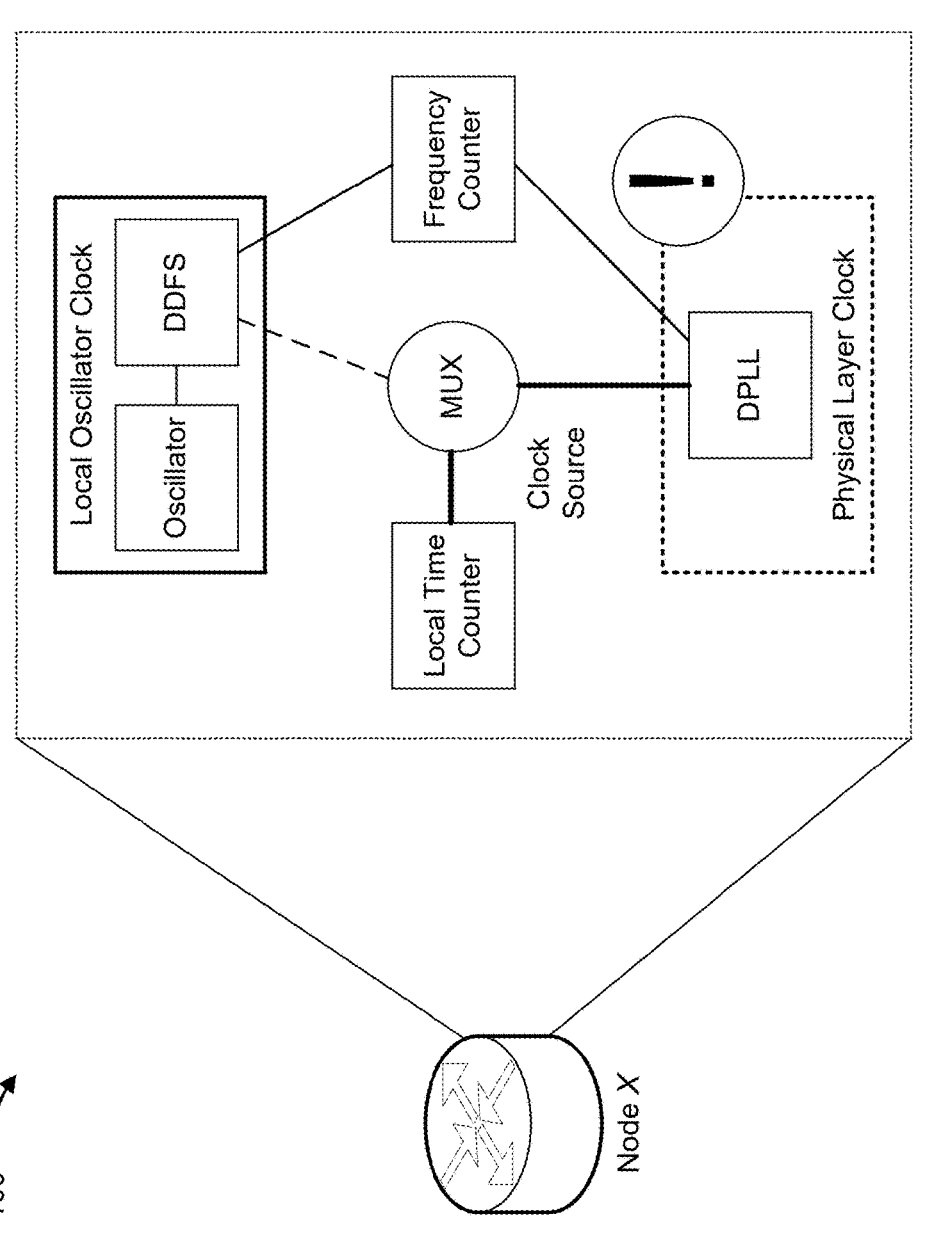

As shown in FIG. 1D, and by reference number 106, the node may identify an issue that is associated with the physical layer clock (e.g., after tuning the frequency of the local oscillator clock). For example, the node (e.g., using the DPLL) may determine that a link associated with the physical layer clock (e.g., a link through which the DPLL obtains the physical layer clock signal) is down and/or determine that a QL of the physical layer clock is degraded. As another example, the node may receive (e.g., via the link and the DPLL, or via another link) an Ethernet synchronization message channel (ESMC) message indicating that the QL of the physical layer clock is degraded.

Figure 1E:
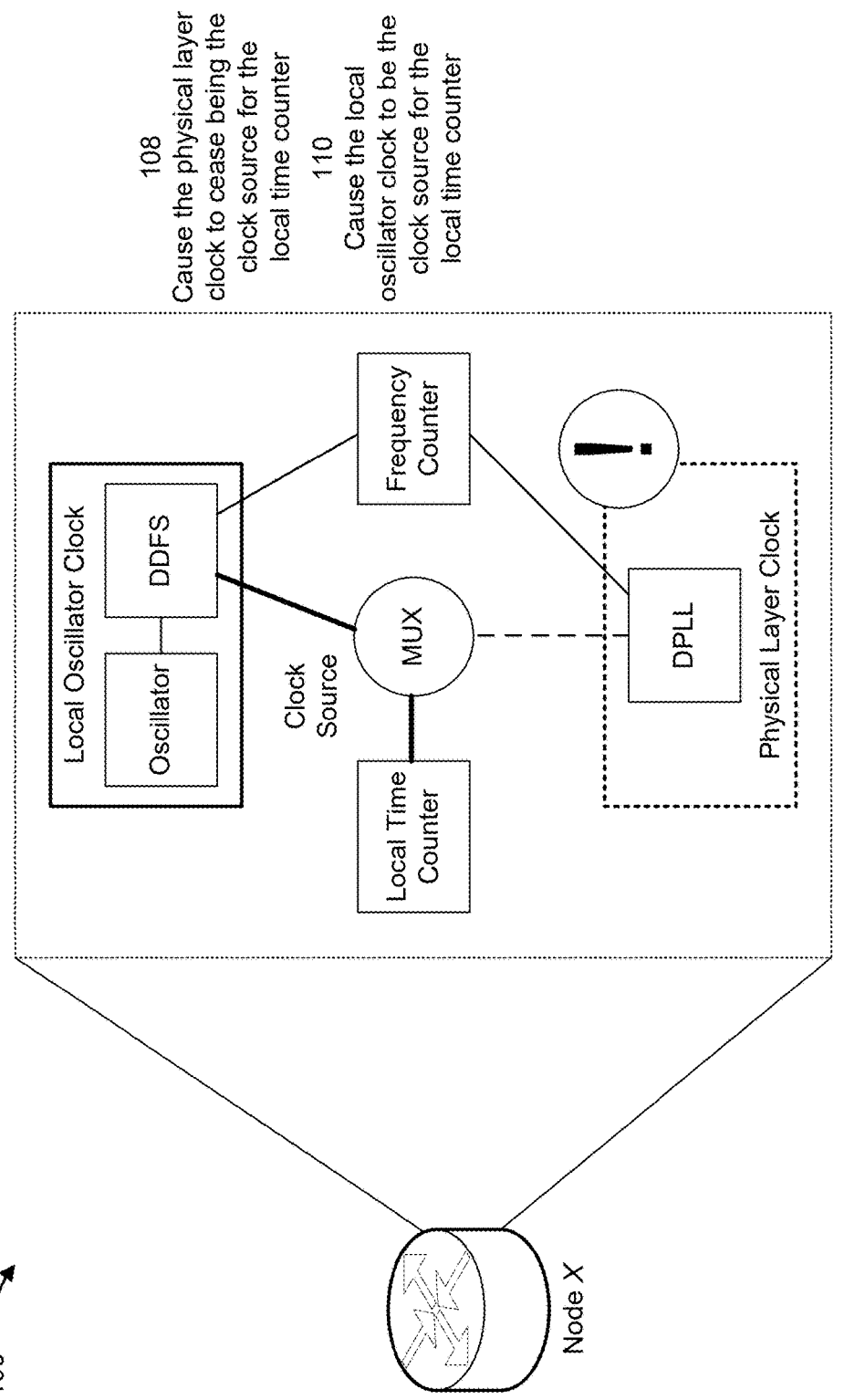

As shown in FIG. 1E, and by reference number 108, the node may cause the physical layer clock to cease being the clock source for the local time counter (e.g., based on identifying the issue that is associated with the physical layer clock). For example, the node may configure the MUX to prevent forwarding of the physical layer clock signal associated with the physical layer clock to the local time counter.

As shown by reference number 110, the node may cause the local oscillator clock to be the clock source for the local time counter (e.g., based on identifying the issue that is associated with the physical layer clock). For example, the node may configure the MUX to forward the local oscillator clock signal associated with the local oscillator clock to the local time counter. In this way, the node may then use the local oscillator clock signal to drive the local time counter.

Causing the physical layer clock to cease being the clock source for the local time counter and then causing local oscillator clock to be the clock source for the local time counter prevents (or minimizes) local time counter jump and/or drift. Notably, because the node tuned the frequency of the local oscillator clock to match the frequency of the physical layer clock (e.g., prior to the physical layer clock switchover), a phase error transient response (e.g., a Sync-E phase error transient response) of the node is reduced (e.g., as compared to switching to an untuned local oscillator clock).

As shown in FIG. 1F, and by reference number 112, the node may cause the local oscillator clock to cease being the clock source for the local time counter (e.g., after causing the local oscillator clock to be the clock source for the local time counter). For example, the node may configure the MUX to prevent forwarding of the local oscillator clock signal associated with the local oscillator clock to the local time counter.

In some implementations, the node may cause the local oscillator clock to cease being the clock source for the local time counter based on the node identifying that the issue associated with the physical layer clock is resolved. To determine that the issue is resolved, the node (e.g., using the DPLL) may determine that the link associated with the physical layer clock is up and/or determine that the QL of the physical layer clock is not degraded. As another example, the node may receive (e.g., via the link and the DPLL, or via another link) an ESMC message indicating that the QL of the physical layer clock is not degraded. In an additional example, the node may determine that a link associated with another physical layer clock is available.

Additionally, or alternatively, the node may cause the local oscillator clock to cease being the clock source for the local time counter based on the node identifying that a time interval (e.g., on the order of seconds, minutes, or longer) since causing the local oscillator clock to be the clock source for the local time counter has elapsed. To determine that the time interval has elapsed, the node may identify an initiation time at which the node caused the local oscillator clock to be the clock source for the local time counter and may determine that a difference between a current time and the initiation time is greater than the time interval.

As shown by reference number 114, the node may cause a particular physical layer clock to be the clock source for the local time counter (e.g., based on at least one of identifying that the issue that is associated with the physical layer clock is resolved, or identifying that the time interval since causing the local oscillator clock to be the clock source for the local time counter has elapsed). The particular physical layer clock may be the physical layer clock (e.g., when the link associated with the physical layer clock is up and/or the QL of the physical layer clock is not degraded) or another physical layer clock (e.g., when the link associated with the other physical layer clock is available). Accordingly, to cause the particular physical layer clock to be the clock source for the local time counter, the node may configure the MUX to forward a particular physical layer clock signal associated with the particular physical layer clock to the local time counter. In this way, the node may then use the particular physical layer clock signal to drive the local time counter. This prevents any phase or frequency error from accumulating that might otherwise accumulate if the local oscillator clock were to be the clock source for the local time counter for an indeterminate period of time.

As shown in FIG. 1G, and by reference number 116, the node may determine another frequency offset between the particular physical layer clock and the local oscillator clock (e.g., based on causing the particular physical layer clock to be the clock source for the local time counter). In some implementations, the node may use the frequency counter to identify a first frequency associated with the particular physical layer clock, and may identify, using the frequency counter, a second frequency associated with the local oscillator clock. For example, the node (e.g., using the frequency counter) may sample the particular physical layer clock signal to identify the first frequency associated with the physical layer clock and/or may sample the local oscillator clock signal to identify the second frequency associated with the local oscillator clock. Accordingly, the node may determine the frequency offset based on the first frequency and the second frequency (e.g., by determining a difference between the first frequency and the second frequency).

Figure 1H:
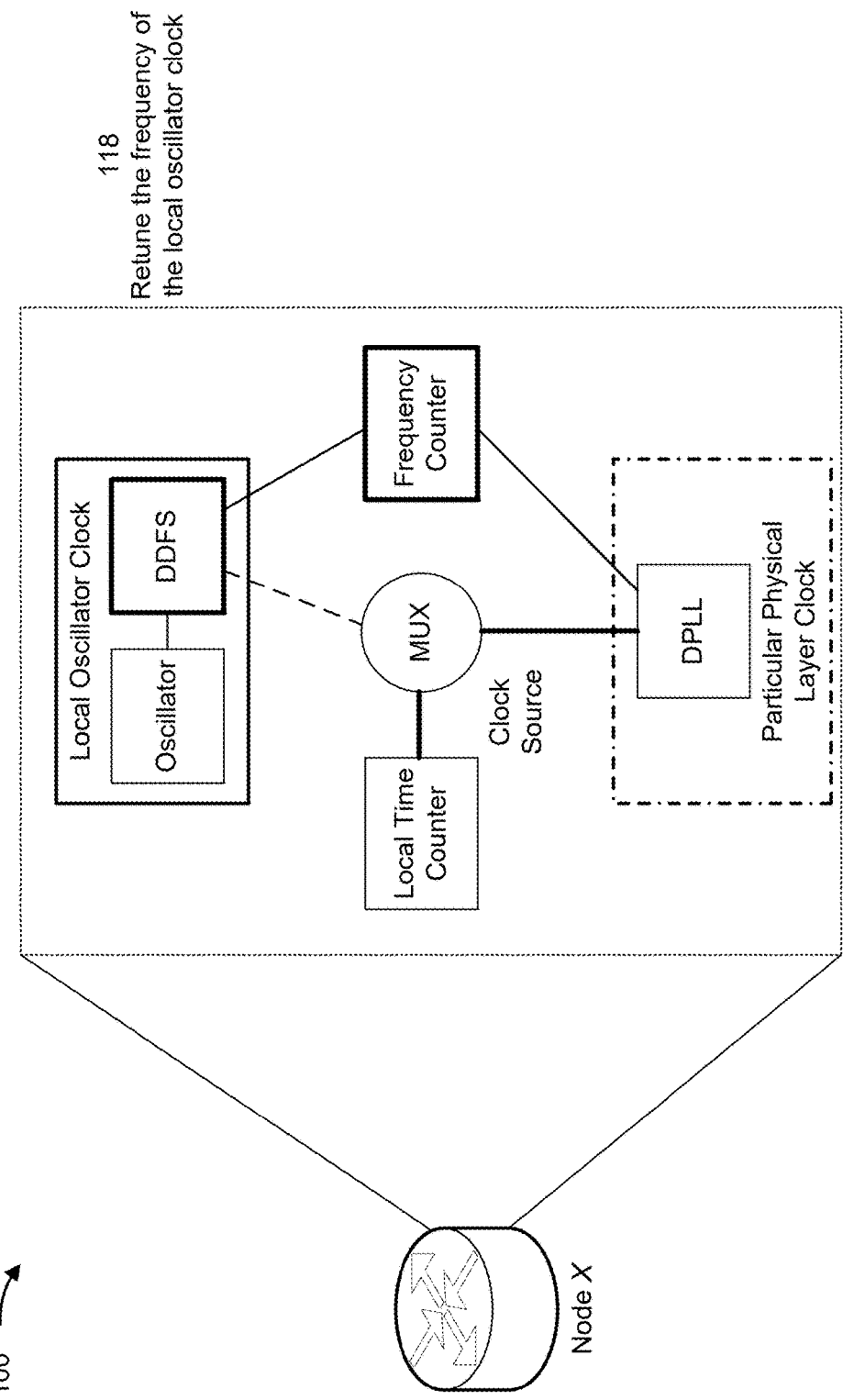

As shown in FIG. 1H, and by reference number 118, the node may retune the frequency of the local oscillator clock (e.g., based on the other frequency offset). For example, the node may send one or more frequency adjustment commands to the DDFS associated with the local oscillator clock. This may cause the DDFS to modify a frequency of the local oscillator clock signal (e.g., to allow the frequency of the local oscillator clock signal to be equal to, within a tolerance, a frequency of the particular physical layer clock signal). In this way, in some implementations, the node may tune the frequency of the local oscillator clock to cause the frequency of the local oscillator clock to match a frequency of the particular physical layer clock (e.g., within the tolerance).

Figure 1I:
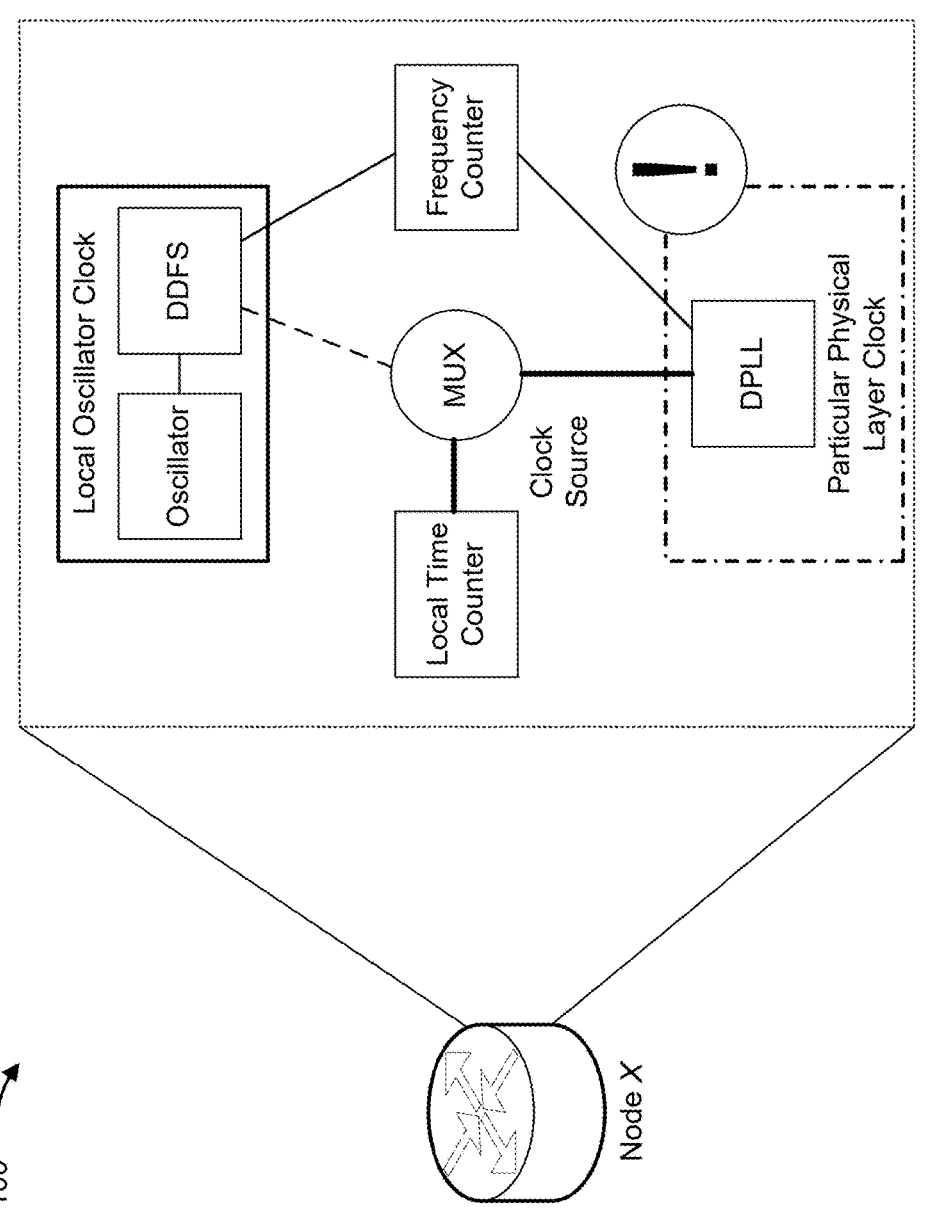

As shown in FIG. 1I, and by reference number 120, the node may identify another issue that is associated with the particular physical layer clock (e.g., after causing the particular physical layer clock to be the clock source for the local time counter and/or after retuning the frequency of the local oscillator clock). For example, the node (e.g., using the DPLL) may determine that a link associated with the particular physical layer clock (e.g., a link through which the DPLL obtains the particular physical layer clock signal) is down and/or determine that a QL of the particular physical layer clock is degraded. As another example, the node may receive (e.g., via the link and the DPLL, or via another link) an ESMC message indicating that the QL of the particular physical layer clock is degraded.

Figure 1J:
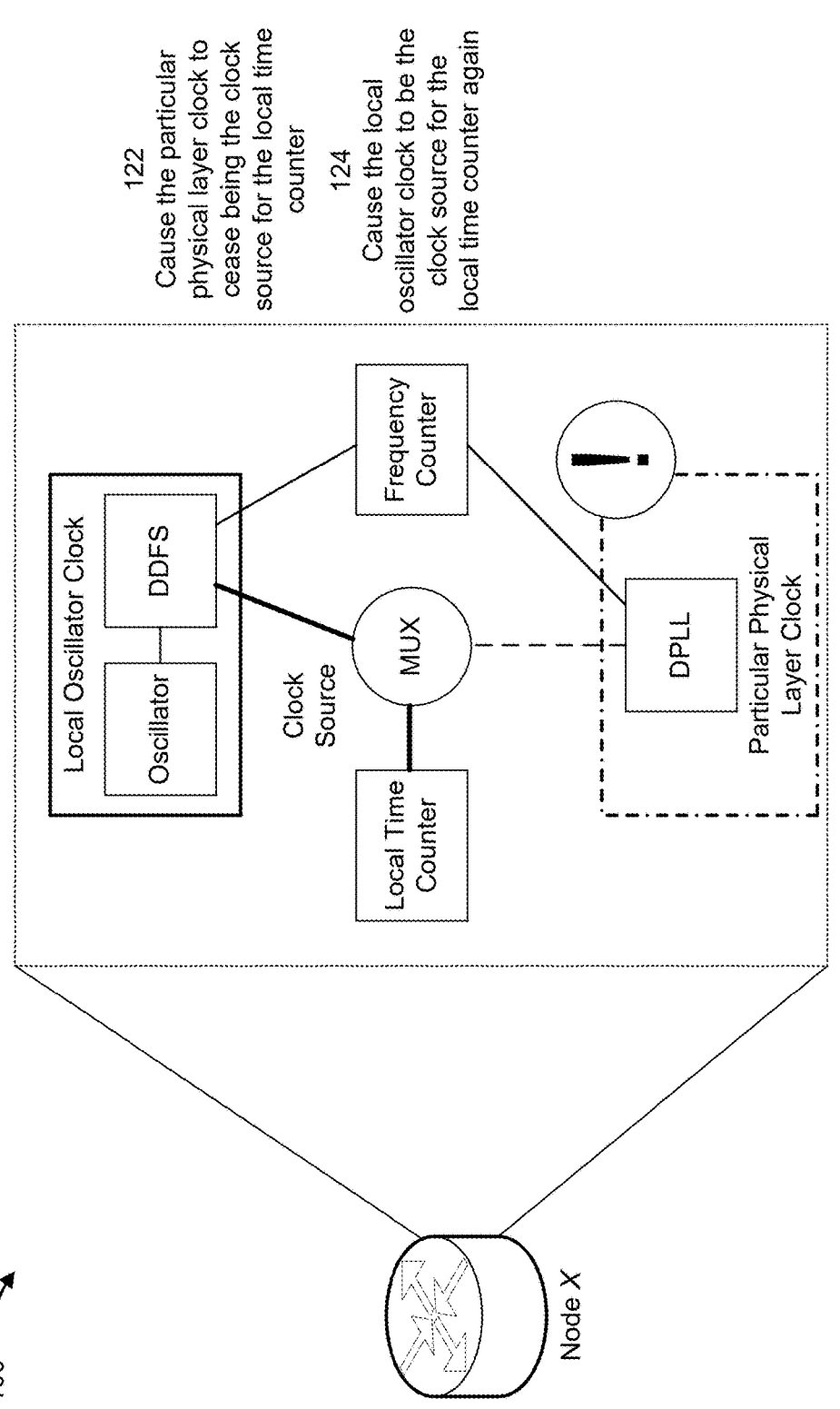

As shown in FIG. 1J, and by reference number 122, the node may cause the particular physical layer clock to cease being the clock source for the local time counter (e.g., based on identifying the other issue that is associated with the particular physical layer clock). For example, the node may configure the MUX to prevent forwarding of the particular physical layer clock signal associated with the particular physical layer clock to the local time counter.

As shown by reference number 124, the node may cause the local oscillator clock to be the clock source for the local time counter again (e.g., based on identifying the other issue that is associated with the particular physical layer clock). For example, the node may configure the MUX to forward the local oscillator clock signal associated with the local oscillator clock to the local time counter. In this way, the node may then use the local oscillator clock signal to drive the local time counter.

Causing the particular physical layer clock to cease being the clock source for the local time counter and the causing local oscillator clock to be the clock source for the local time counter is another example of a physical layer clock switchover. Notably, because the node retuned the frequency of the local oscillator clock to match the frequency of the particular physical layer clock (e.g., prior to the physical layer clock switchover), a phase error transient response (e.g., a Sync-E phase error transient response) of the node is reduced (e.g., as compared to switching to an untuned local oscillator clock).

As indicated above, FIGS. 1A-1J are provided as an example. Other examples may differ from what is described with regard to FIGS. 1A-1J. The number and arrangement of devices shown in FIGS. 1A-1J are provided as an example. In practice, there may be additional devices, fewer devices, different devices, or differently arranged devices than those shown in FIGS. 1A-1J. Furthermore, two or more devices shown in FIGS. 1A-1J may be implemented within a single device, or a single device shown in FIGS. 1A-1J may be implemented as multiple, distributed devices. Additionally, or alternatively, a set of devices (e.g., one or more devices)

shown in FIGS. 1A-1J may perform one or more functions described as being performed by another set of devices shown in FIGS. 1A-1J.

Figure 2:
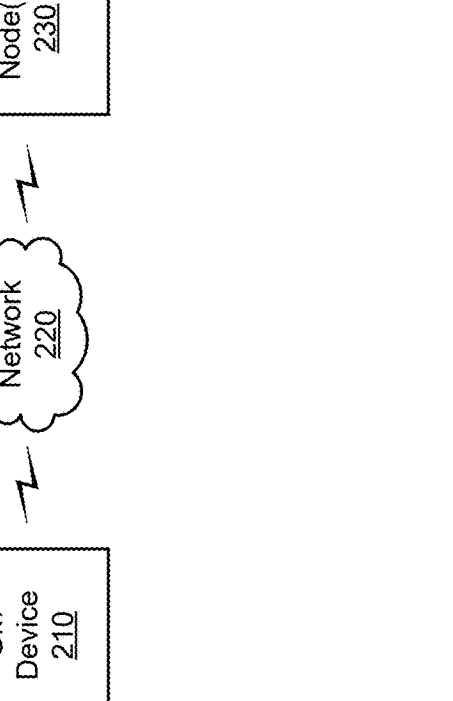
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a GM device 210, a network 220, and one or more nodes 230. Devices and/or elements of environment 200 may interconnect via wired connections and/or wireless connections.

GM device 210 includes one or more devices capable of receiving, generating, storing, processing, and/or providing a physical layer clock signal and time and/or phase information over packets. In some implementations, GM device 210 may receive timing information for the network 220 from one or more of a global positioning system receiver, an atomic clock, another device that receives timing information from a timing source, and/or the like.

Network 220 is a synchronization network and includes one or more wired and/or wireless networks. For example, network 220 may include a cellular network, a public land mobile network (PLMN), a local area network (LAN), a wide area network (WAN), a private network, the Internet, and/or a combination of these or other types of networks. The network 220 enables communication among the devices of environment 200.

Node 230 includes one or more devices capable of receiving, processing, storing, routing, and/or providing information in a manner described herein. For example, node 230 may include a router, such as a label switching router (LSR), a label edge router (LER), an ingress router, an egress router, a provider router (e.g., a provider edge router or a provider core router), a virtual router, or another type of router. Additionally, or alternatively, node 230 may include a gateway, a switch, a firewall, a hub, a bridge, a reverse proxy, a server (e.g., a proxy server, a cloud server, or a data center server), a load balancer, and/or a similar device. In some implementations, node 230 may be a BC-type node, an OC-type node, or a similar type of device. In some implementations, node 230 may be a physical device implemented within a housing, such as a chassis. In some implementations, node 230 may be a virtual device implemented by one or more computer devices of a cloud computing environment or a data center. Node 230 may include a remote radio transceiver that connects to an operator radio control panel via an electrical interface or a wireless interface. Node 230 may include radio frequency (RF) circuitry, analog-to-digital/digital-to-analog converters, and/or up/down converters.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
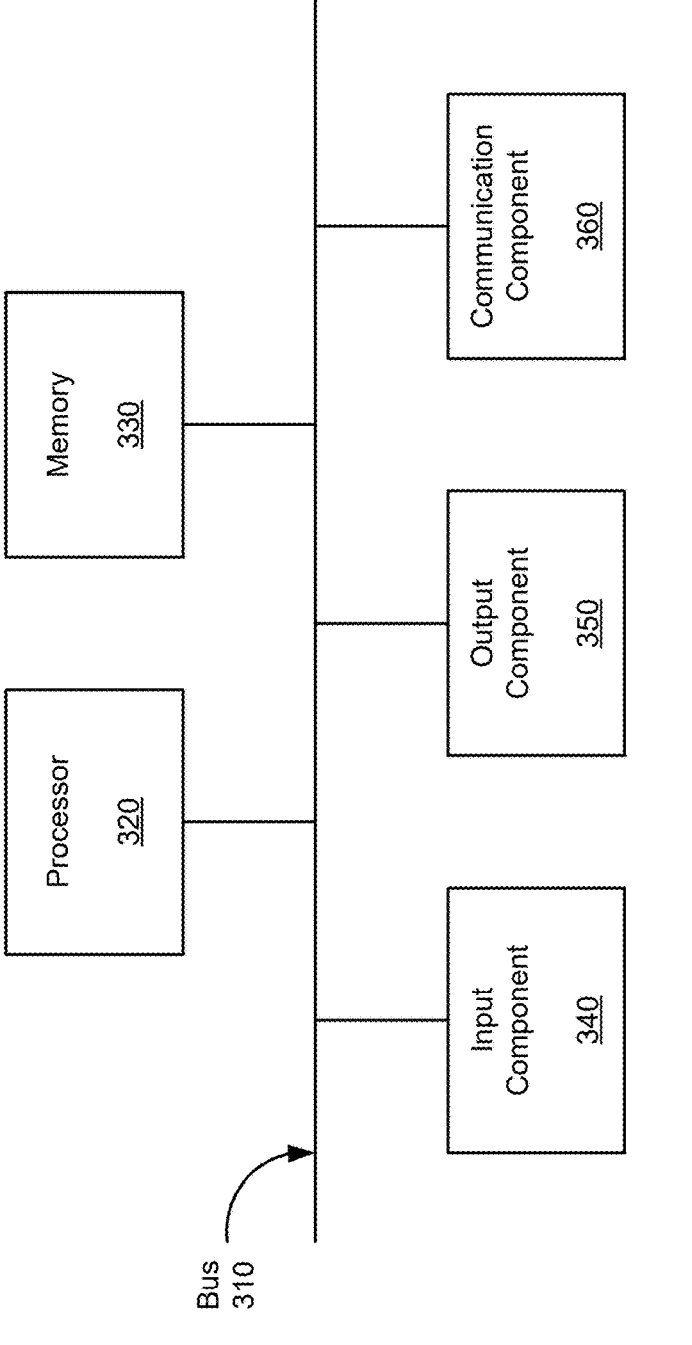
FIG. 3 is a diagram of example components of a device.

FIG. 3 is a diagram of example components of a device 300, which may correspond to GM device 210 and/or node 230. In some implementations, GM device 210 and/or node 230 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
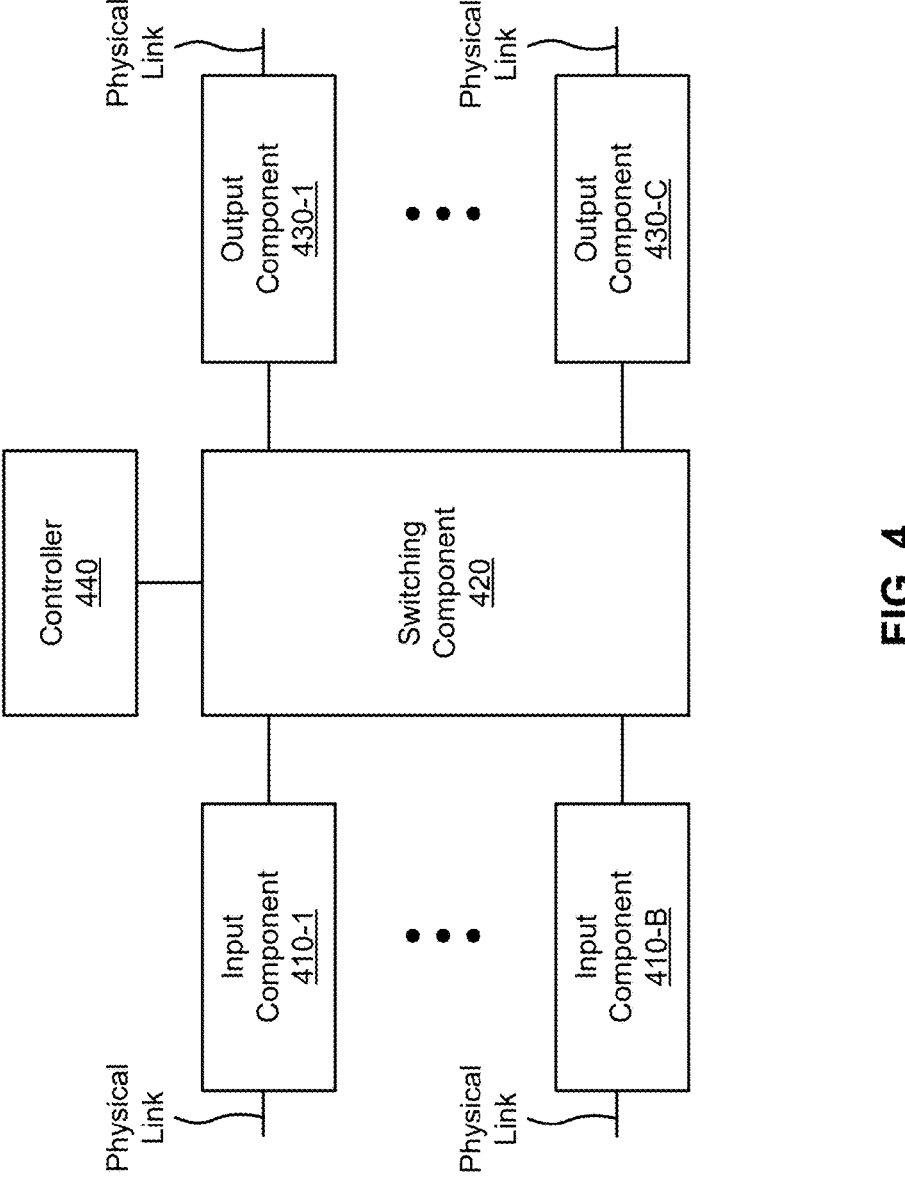
FIG. 4 is a diagram of example components of a device.

FIG. 4 is a diagram of example components of a device 400. Device 400 may correspond to GM device 210 and/or node 230. In some implementations, GM device 210 and/or node 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with reducing phase error associated with physical layer clock switchover. In some implementations, one or more process blocks of FIG. 5 are performed by a node (e.g., node 230). In some implementations, one or more process blocks of FIG. 5 are performed by another device or a group of devices separate from or including the node, such as another node (e.g., another node 230). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or another device.

As shown in FIG. 5, process 500 may include determining a frequency offset between a physical layer clock and a local oscillator clock (block 510). For example, the node may determine a frequency offset between a physical layer clock and a local oscillator clock, as described above. In some implementations, the node uses the physical layer clock as a clock source for a local time counter.

As further shown in FIG. 5, process 500 may include tuning a frequency of the local oscillator clock (block 520). For example, the node may tune, based on the frequency offset, a frequency of the local oscillator clock, as described above.

As further shown in FIG. 5, process 500 may include identifying an issue that is associated with the physical layer clock (block 530). For example, the node may identify, after tuning the frequency of the local oscillator clock, an issue that is associated with the physical layer clock, as described above.

As further shown in FIG. 5, process 500 may include causing the local oscillator clock to be the clock source for the local time counter (block 540). For example, the node may cause, based on identifying the issue that is associated with the physical layer clock, the local oscillator clock to be the clock source for the local time counter, as described above.

As further shown in FIG. 5, process 500 may include identifying that the issue that is associated with the physical layer clock is resolved (block 550). For example, the node may identify (e.g., after causing the local oscillator clock to be the clock source for the local time counter) that the issue that is associated with the physical layer clock is resolved, as described above.

As further shown in FIG. 5, process 500 may include (e.g., as alternative to block 550) identifying that a time interval since causing the local oscillator clock to be the clock source for the local time counter has elapsed (block 560). For example, the node may identify (e.g., after causing the local oscillator clock to be the clock source for the local time counter) that a time interval since causing the local oscillator clock to be the clock source for the local time counter has elapsed, as described above.

As further shown in FIG. 5, process 500 may include causing the physical layer clock, or another physical layer clock, to be the clock source for the local time counter (block 560). For example, the node may cause (e.g., based on identifying that the issue that is associated with the physical layer clock is resolved or based on identifying that the time interval since causing the local oscillator clock to be the clock source for the local time counter has elapsed), the physical layer clock, or another physical layer clock, to be the clock source for the local time counter, as described above. Process 500 then may include looping back to block 510 to perform one or more operations described herein.

Process 500 may include additional implementations, such as any single implementation or any combination of implementations described below and/or in connection with one or more other processes described elsewhere herein.

In a first implementation, process 500 includes causing, after causing the local oscillator clock to be the clock source for the local time counter, a particular physical layer clock, of the physical layer clock and another physical layer clock, to be the clock source for the local time counter.

In a second implementation, alone or in combination with the first implementation, process 500 includes determining, based on causing the particular physical layer clock to be the clock source for the local time counter, another frequency offset between the particular physical layer clock and the local oscillator clock, and retuning, based on the other frequency offset, the frequency of the local oscillator clock.

In a third implementation, alone or in combination with one or more of the first through second implementations, process 500 includes identifying, by the node and after causing the particular physical layer clock to be the clock source for the local time counter, another issue that is associated with the particular physical layer clock, and causing, based on identifying the other issue that is associated with the particular physical layer clock, the local oscillator clock to be the clock source for the local time counter again.

In a fourth implementation, alone or in combination with one or more of the first through third implementations, identifying the issue that is associated with the physical layer clock comprises at least one of determining that a link associated with the physical layer clock is down, determining that a quality level (QL) of the physical layer clock is degraded, or receiving an Ethernet synchronization message channel (ESMC) message indicating that the QL of the physical layer clock is degraded.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
determining, by a node, a frequency offset between a physical layer clock and a local oscillator clock,
  wherein the node uses the physical layer clock as a clock source for a local time counter;
tuning, by the node and based on the frequency offset, a frequency of the local oscillator clock;
identifying, by the node and after tuning the frequency of the local oscillator clock, an issue that is associated with the physical layer clock; and
causing, by the node and based on identifying the issue that is associated with the physical layer clock, the local oscillator clock to be the clock source for the local time counter.

2. The method of claim 1, further comprising:
identifying, after causing the local oscillator clock to be the clock source for the local time counter, that the issue that is associated with the physical layer clock is resolved; and
causing, based on identifying that the issue that is associated with the physical layer clock is resolved, the physical layer clock, or another physical layer clock, to be the clock source for the local time counter.

3. The method of claim 1, further comprising:
identifying that a time interval since causing the local oscillator clock to be the clock source for the local time counter has elapsed; and
causing, based on identifying that the time interval since causing the local oscillator clock to be the clock source for the local time counter has elapsed, the physical layer clock, or another physical layer clock, to be the clock source for the local time counter.

4. The method of claim 1, further comprising:
causing, after causing the local oscillator clock to be the clock source for the local time counter, a particular physical layer clock, of the physical layer clock and another physical layer clock, to be the clock source for the local time counter.

5. The method of claim 4, further comprising:
determining, based on causing the particular physical layer clock to be the clock source for the local time counter, another frequency offset between the particular physical layer clock and the local oscillator clock; and
retuning, based on the other frequency offset, the frequency of the local oscillator clock.

6. The method of claim 4, further comprising:
identifying, by the node and after causing the particular physical layer clock to be the clock source for the local time counter, another issue that is associated with the particular physical layer clock; and
causing, based on identifying the other issue that is associated with the particular physical layer clock, the local oscillator clock to be the clock source for the local time counter again.

7. The method of claim 1, wherein identifying the issue that is associated with the physical layer clock comprises at least one of:
determining that a link associated with the physical layer clock is down;
determining that a quality level (QL) of the physical layer clock is degraded; or
receiving an Ethernet synchronization message channel (ESMC) message indicating that the QL of the physical layer clock is degraded.

8. A node, comprising:
one or more memories; and
one or more processors to:
  determine a frequency offset between a physical layer clock and a local oscillator clock,
  tune, based on the frequency offset, a frequency of the local oscillator clock;
  identify, after tuning the frequency of the local oscillator clock, an issue that is associated with the physical layer clock; and
  cause, based on identifying the issue that is associated with the physical layer clock, the local oscillator clock to be a clock source for a local time counter.

9. The node of claim 8, wherein the one or more processors are further to:
cause, based on at least one of identifying that the issue that is associated with the physical layer clock is resolved or identifying that a time interval since causing the local oscillator clock to be the clock source for the local time counter has elapsed, the physical layer clock, or another physical layer clock, to be the clock source for the local time counter.

10. The node of claim 8, wherein the one or more processors are further to:
cause, after causing the local oscillator clock to be the clock source for the local time counter, a particular physical layer clock, of the physical layer clock and another physical layer clock, to be the clock source for the local time counter.

11. The node of claim 10, wherein the one or more processors are further to:

determine, based on causing the particular physical layer clock to be the clock source for the local time counter, another frequency offset between the particular physical layer clock and the local oscillator clock; and retune, based on the other frequency offset, the frequency of the local oscillator clock.

12. The node of claim 10, wherein the one or more processors are further to:

identify, after causing the particular physical layer clock to be the clock source for the local time counter, another issue that is associated with the particular physical layer clock; and cause, based on identifying the other issue that is associated with the particular physical layer clock, the local oscillator clock to be the clock source for the local time counter again.

13. The node of claim 8, further comprising:

an oscillator; and a direct digital frequency synthesizer (DDFS), wherein:

the local oscillator clock includes the oscillator and the DDFS.

14. The node of claim 8, further comprising:

a frequency counter, wherein:

the one or more processors, to determine the frequency offset, are to:

identify, using the frequency counter, a first frequency associated with the physical layer clock;

identify, using the frequency counter, a second frequency associated with the local oscillator clock; and determine the frequency offset based on the first frequency and the second frequency.

15. The node of claim 8, wherein the one or more processors, to tune the frequency of the local oscillator clock, are to:

send, based on the frequency offset, one or more frequency adjustment commands to a direct digital frequency synthesizer (DDFS) associated with the local oscillator clock.

16. The node of claim 8, further comprising:

a digital phase-locked loop (DPLL) associated with the physical layer clock, wherein:

the one or more processors, to identify the issue that is associated with the physical layer clock, are to:

determining, using the DPLL, that at least one of:

a link associated with the physical layer clock is down; or a quality level (QL) of the physical layer clock is degraded.

17. A non-transitory computer-readable medium storing a set of instructions, the set of instructions comprising:

one or more instructions that, when executed by one or more processors of a node, cause the node to:

tune, based on a frequency offset between a physical layer clock and a local oscillator clock, a frequency of the local oscillator clock;

identify, after tuning the frequency of the local oscillator clock, an issue that is associated with the physical layer clock; and cause, based on identifying the issue that is associated with the physical layer clock, the local oscillator clock to be a clock source for a local time counter.

18. The non-transitory computer-readable medium of claim 17, wherein the one or more instructions further cause the node to:

cause, based on at least one of identifying that the issue that is associated with the physical layer clock is resolved or identifying that a time interval since causing the local oscillator clock to be the clock source for the local time counter has elapsed, the local oscillator clock to cease being the clock source for the local time counter.

19. The non-transitory computer-readable medium of claim 17, wherein the one or more instructions further cause the node to:

retune, after causing the local oscillator clock to cease being the clock source for the local time counter, the frequency of the local oscillator clock based on another frequency offset between a particular physical layer clock, of the physical layer clock and another physical layer clock, and the local oscillator clock.

20. The non-transitory computer-readable medium of claim 19, wherein the one or more instructions further cause the node to:

cause, after retuning the frequency of the local oscillator clock, the local oscillator clock to be the clock source for the local time counter again.

* * * * *